Nov. 12, 1940.  H. A. JONES  2,221,451
AUTOMOBILE MAP DEVICE
Filed June 26, 1939
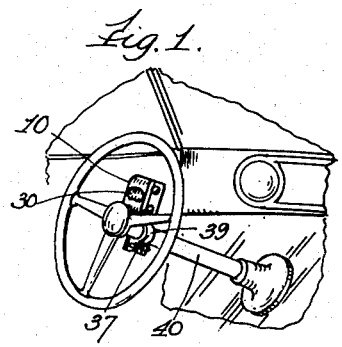
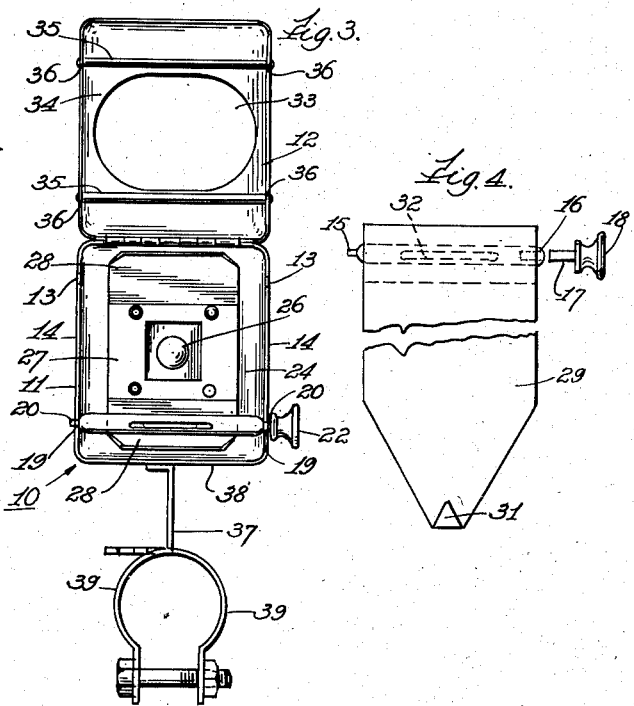
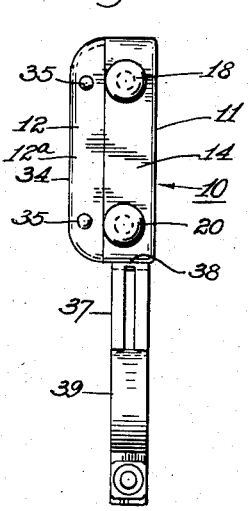
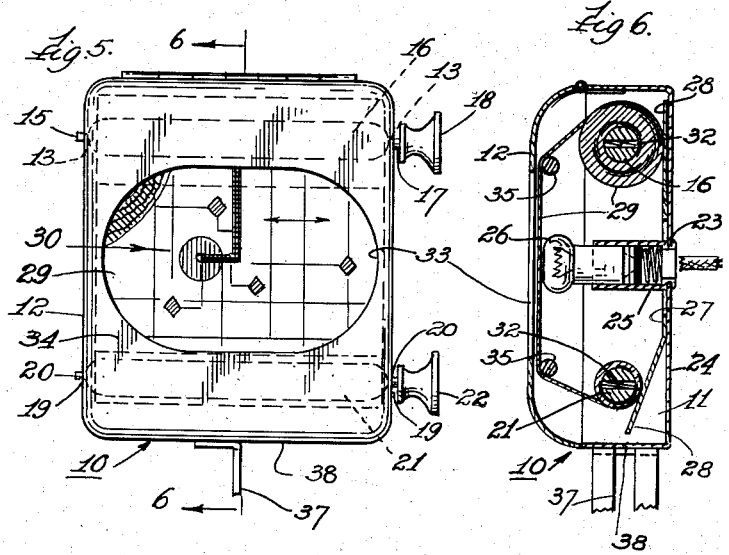
Inventor
Howard Aldred Jones.
by James R. McKnight
his Attorney Patented Nov. 12, 1940

2,221,451

UNITED STATES PATENT OFFICE 2,221,451

AUTOMOBILE MAP DEVICE

Howard Aldred Jones, New York, N. Y.

Application June 26, 1939, Serial No. 281,109

1 Claim. (Cl. 40—86)

My invention relates to a device for holding an automobile map on or adjacent to the steering post of an automobile, said device having means for displaying portions of the map as the trip progresses at the control of the user.

Persons travelling by automobile ordinarily find it most convenient to orient themselves by reference to road maps. These maps are large, bulky, cumbersome and difficult to fold and unfold. It is dangerous for a driver to consult such a map while driving and it is usually necessary for him to stop and look at the map before proceeding. Often after starting he wants to look at the map again and must go through the whole procedure again. All this is difficult, time wasting, inefficient and annoying.

It is among the objects of my invention to solve the foregoing problem and provide a device that will display a map so that the driver can see and use it even while driving. It is also the object of this invention to provide means for the removable insertion and use of different maps as desired, and such other objects, advantages and capabilities as will later more fully appear and which are inherently possessed by my invention.

While I have shown in the accompanying drawing a preferred embodiment of my invention yet I wish it understood that the same is susceptible of modification and change without departing from the spirit of my invention.

Referring to the drawing Fig. 1 is a perspective view of my map holder attached in position on the steering wheel post of an automobile; Fig. 2 is a side elevation of my device; Fig. 3 is a side elevational view of my device in open position with the map removed revealing the interior; Fig. 4 is a detailed view of the roller and map strip; Fig. 5 is a front view of my device ready for operation; Fig. 6 is a detailed sectional view on line 6—6 of Fig. 5.

The embodiment selected to illustrate the preferred form of my invention comprises a casing 10 having a bottom portion 11 and a top portion 12 swingably hinged to the bottom portion 11.

The bottom portion 11 has a pair of oppositely disposed apertures 13 in its side walls 14 adjacent the upper portion thereof. One of these apertures, preferably the one at the left, rotatably receives the end pin 15 of a roller 16. The other of apertures 13 receives a removable pin 17 on the inner end of knob 18. This pin 17 is adapted to removably engage the opposite end of roller 16.

Adjacent the lower end of bottom portion 11 through side walls 14 are oppositely disposed apertures 19 to receive the end pins 20 on opposite ends of roller 21. A knob 22 is attached to one of said end pins 20. An aperture 23 in the bottom 24 of bottom portion 11 receives a socket 25 and an electric light bulb 26. Connections of course may be provided from the socket to the battery of the automobile or any desired source of electrical supply.

Attached to the bottom 24 of bottom portion 11 is a flat member 27 having bent up portions 28 adjacent each end and positioned underneath rollers 16 and 21.

The top roller 16 is adapted to be removed from the casing 10 and to have rolled thereon a strip of flexible material 29 having a map 30 printed thereon. The strip 29 has preferably pointed ends 31, one of which is placed in groove 32 in roller 16 and the other in groove 32 in roller 21. The strip is thus held between the rollers 16 and 21 and by operation of knobs 18 and 22 may be rolled backwards or forwards from end to end.

The top portion 12 of the casing 10 has a window or aperture 33 in its top 34. A pair of longitudinally spaced and laterally extending rollers 35 are rotatably attached through apertures 36 to the side walls 12a of the top portion 12. These rollers 35 facilitate the movement of rollers 16 and 21.

A clamping device 37 has an upper member attached to the lower side wall 38 of bottom member 11, a pair of gripping portions 39 for the attachment of casing 10 to the steering post 40 of an automobile, and releasable tightening means 41 for holdng the casing in fixed position on the post 40.

In use, let us assume for purposes of illustration, that the user is a motorist who is about to take a trip from Chicago to St. Louis by automobile over a certain road. He has a strip 29 which has on it a map 30 of his proposed journey. He attaches the strip to the rollers 16 and 21. The map 30 on the strip 29 starts from the loop in Chicago. This portion of the map 30 shows through the window 33. As the motorist drives he turns knob 22 and the portion of the map showing through window 33 continues along the journey. The user thus has at all times before him a map that does not need to be folded. The map shows the driver just where he is as he proceeds. No search on a large map is necessary. There is no need to stop the car to look at a map. Danger and delay are avoided. The map in the casing being positioned on the steering post is operable at the flick of a finger of the driver and is convenient for his vision. The combination is such as to afford maximum efficiency at a minimum of effort for the user.

Having thus described my invention, I claim:

In an automobile map device, a casing having a lower deeper body member and a shallower upper cover member hinged to the body member, a pair of longitudinally spaced lower rollers removably and rotatably attached to the side walls of said body member, a strip map removably rolled around and extending between said lower rollers, knobs attached to said lower rollers and turnable from the exterior of the casing, a braking member having a flat portion attached to the inner bottom portion of said body member, said braking member having adjacent its lower end an integral bent up portion positioned to contact the adjacent lower roller, said braking member also having adjacent its upper end an integral bent up portion positioned to contact the adjacent upper roller, said body member having an opening in its bottom portion, said braking member having an opening in its flat portion registering with the opening in said body member, an electric light socket extending through said openings and held in position against the walls of said body member and said braking member, an electric light bulb in said body member attached to said electric light socket, said cover member having a window, a pair of upper rollers extending laterally across said cover member and rotatably attached to the side walls on the inside of said cover member, said upper rollers spaced longitudinally so that when the cover member is in closed position with relation to said body member, each of said upper rollers is substantially directly above its corresponding lower roller to facilitate movement of the map between said lower rollers and to maintain a portion of the map in cooperation with the bent up portions of said braking member in taut position to be seen through the window in said cover member.

HOWARD ALDRED JONES.